United States Patent
Ochiai (10) Patent No.: US 10,725,698 B2
(45) Date of Patent: Jul. 28, 2020

(54) MEMORY CONTROLLER AND CONTROL METHOD THEREOF

(71) Applicant: CANON KABUSHIKI KAISHA, Tokyo (JP)

(72) Inventor: Wataru Ochiai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 149 days.

(21) Appl. No.: 15/981,294

(22) Filed: May 16, 2018

(65) Prior Publication Data

US 2018/0349060 A1 Dec. 6, 2018

(30) Foreign Application Priority Data

May 31, 2017 (JP) ................................ 2017-107452

(51) Int. Cl.
*G06F 3/06* (2006.01)
*G06F 13/16* (2006.01)

(52) U.S. Cl.
CPC .......... *G06F 3/0659* (2013.01); *G06F 3/0604* (2013.01); *G06F 3/0673* (2013.01); *G06F 13/1668* (2013.01); *G06F 13/1673* (2013.01)

(58) Field of Classification Search
CPC .... G06F 3/0659; G06F 3/0604; G06F 3/0673; G06F 13/1668; G06F 13/1673
See application file for complete search history.

(56) References Cited

U.S. PATENT DOCUMENTS

| 6,145,063 | A  | * | 11/2000 | Ueno ............... | G06F 12/0215 711/157 |
| 6,366,989 | B1 | * | 4/2002  | Keskar ............. | G06F 13/1694 365/189.15 |
| 2003/0188092 | A1 | * | 10/2003 | Heath .............. | G06F 3/0601 711/111 |
| 2003/0217239 | A1 | * | 11/2003 | Jeddeloh .......... | G06F 13/1626 711/158 |
| 2005/0091460 | A1 | * | 4/2005  | Rotithor .......... | G06F 13/1631 711/158 |
| 2005/0144371 | A1 | * | 6/2005  | Walker ............ | G06F 12/0879 711/105 |

(Continued)

OTHER PUBLICATIONS

K. Ayukawa, T. Watanabe and S. Narita, "An access-sequence control scheme to enhance random-access performance of embedded DRAM's," in IEEE Journal of Solid-State Circuits, vol. 33, No. 5, pp. 800-806, May 1998. (Year: 1998).*

*Primary Examiner* — Ramon A. Mercado
(74) *Attorney, Agent, or Firm* — Canon U.S.A., Inc. IP Division (57) ABSTRACT

Provided is a controller which issues a first write command for writing all data of a burst access operation on a memory and a second write command for writing data of a burst access operation on a memory per byte. The controller includes a holding unit configured to hold a plurality of commands requesting access to the memory and a selection unit configured to select, in a case where the holding unit holds the second write command and a command that causes a first time penalty longer than a second time penalty needed between the first write command that is issued first and the second write command that is issued next, the second write command prior to the command.

18 Claims, 10 Drawing Sheets

(56) References Cited

U.S. PATENT DOCUMENTS

| | | | |
|---|---|---|---|
| 2005/0253858 A1* | 11/2005 | Ohkami | G06F 12/0862 |
| | | | 345/531 |
| 2008/0059748 A1* | 3/2008 | Klint | G06F 13/1668 |
| | | | 711/167 |
| 2009/0100206 A1* | 4/2009 | Wang | G06F 13/1673 |
| | | | 710/112 |
| 2012/0239873 A1* | 9/2012 | Huang | G06F 13/1626 |
| | | | 711/105 |
| 2013/0003475 A1* | 1/2013 | Jenkins | G11C 7/1066 |
| | | | 365/193 |
| 2013/0007574 A1* | 1/2013 | Langadi | G06F 11/1048 |
| | | | 714/807 |
| 2014/0317470 A1* | 10/2014 | Chung | G06F 11/1076 |
| | | | 714/764 |
| 2015/0026375 A1* | 1/2015 | Takamura | G06F 13/1663 |
| | | | 710/110 |
| 2016/0139837 A1* | 5/2016 | Welker | G06F 3/0673 |
| | | | 714/6.11 |
| 2016/0231962 A1* | 8/2016 | Ware | G11C 7/1006 |
| 2016/0328152 A1* | 11/2016 | Nemazie | G06F 3/061 |
| 2017/0075823 A1* | 3/2017 | Ward | G06F 12/1416 |
| 2017/0351433 A1* | 12/2017 | Walker | G06F 3/0685 |
| 2017/0351438 A1* | 12/2017 | Lee | G06F 12/00 |
| 2018/0349060 A1* | 12/2018 | Ochiai | G06F 3/0659 |
| 2019/0042095 A1* | 2/2019 | Vergis | G06F 3/0604 |

* cited by examiner

FIG. 9

MEMORY CONTROLLER AND CONTROL METHOD THEREOF

BACKGROUND OF THE INVENTION

Field of the Invention

The aspect of the embodiments relates to a memory controller. In particular, the aspect of the embodiments relates to a memory controller that issues a different write command depending on whether an invalid byte is included in data written in a memory in a burst write operation.

Description of the Related Art

A Masked Write (MWR) command has been introduced in low power double-data-rate4 (LPDDR4), which is a recently formulated standard. When a memory, which will also be referred to as a dynamic random access memory (DRAM) as needed, receives this command, a read-modify-write operation is performed inside the memory. Specifically, the memory reads data, changes the read data on the basis of a data mask signal, and writes back all the data therein. While data mask control is conventionally performed per byte, this operation enables data mask control per burst write. Namely, since the implementation is simplified, downsizing and power saving can be achieved. In the data mask control, when a data mask signal indicates that data stored in a memory is invalid, the data is not overwritten. When an LPDDR4 memory receives a Write (WR) command as used in a conventional DRAM, the memory recognizes that all data is valid and writes all data. Namely, the read-modify-write operation is not performed inside the memory (see JEDEC STANDARD No. 209-4A).

For a memory that has received an MWR command to perform the read-modify-write operation internally, when an MWR command is issued to the same bank after the previous WR/MWR command is issued, a memory controller is to ensure a prescribed interval, which will be referred to as "tCCDMW" as needed. When a burst length of a burst write operation on a memory is 16, the prescribed interval (tCCDMW) between the WR/MWR command and the MWR command is 32 DRAM clock cycles. When the burst length is 32, the prescribed interval (tCCDMW) is 64 DRAM clock cycles.

In contrast, when a WR command is issued after a WR/MWR command is issued, a shorter prescribed interval, which will be referred to as "tCCD" as needed, is ensured. When the burst length of a burst write operation on a memory is 16, the prescribed interval (tCCD) between the WR/MWR command and the WR command is 8 DRAM clock cycles. When the burst length is 32, the prescribed interval (tCCD) is 16 DRAM clock cycles. Namely, when an MWR command is issued to the same bank after the previous WR/MWR command is issued, a time penalty four times as large as that of a conventional operation (in which the next command is a WR command) is caused, resulting in deterioration of the performance.

SUMMARY OF THE INVENTION

A controller according to an aspect of the embodiment issues a first write command for writing all data of a burst access operation on a memory and a second write command for writing data of a burst access operation on a memory per byte. The controller includes a holding unit configured to hold a plurality of commands requesting access to the memory, and a selection unit configured to select, in a case where the holding unit holds the second write command and a command that causes a first time penalty longer than a second time penalty needed between the first write command that is issued first and the second write command that is issued next, the second write command prior to the command.

Further features of the disclosure will become apparent from the following description of exemplary embodiments with reference to the attached drawings.

DESCRIPTION OF THE EMBODIMENTS

Figure 1:
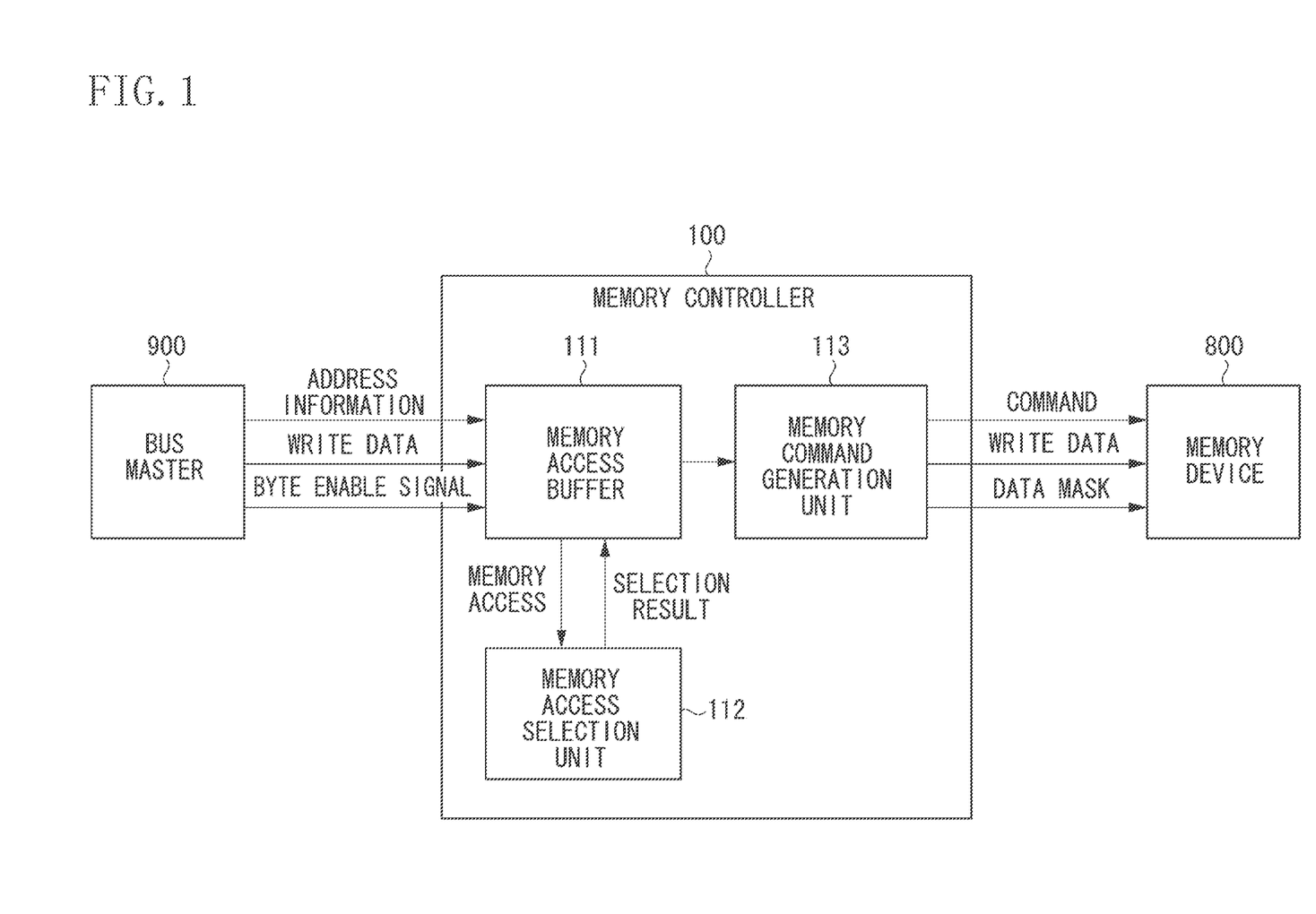
FIG. 1 illustrates a configuration of a memory controller according to a first exemplary embodiment.

FIG. 1 illustrates a configuration of a memory controller 100 according to a first exemplary embodiment. The memory controller 100 is connected to a memory device 800 and a bus master 900. The bus master 900 transmits a memory access including address information, write data, and a byte enable signal to the memory controller 100. The memory controller 100 generates a dynamic random access memory (DRAM) command on the basis of the memory access received from the bus master 900 and transmits the DRAM command to the memory device 800. The memory device 800 includes a plurality of banks, each of which includes a plurality of pages. When a page of a bank is changed and access is made, a penalty (which will be referred to as a page-miss) occurs. When the memory controller 100 writes all data of a burst access operation on the memory device 800, the memory controller 100 accesses the memory device 800 using a write command WR. When the memory controller 100 writes data of a burst access operation on the memory device 800 per byte, the memory controller 100 accesses the memory device 800 using a write command MWR different from the write command WR. Examples of the memory device 800 receiving these write commands include a DRAM based on low power double-data-rate4 (LPDDR4).

A memory access buffer 111 is a buffer that can hold a plurality of memory accesses received from the bus master 900.

A memory access selection unit 112 selects one of the memory accesses held in the memory access buffer 111.

A memory command generation unit 113 converts the memory access selected from the memory access buffer 111 into a format based on the specification of the memory device 800 and issues the converted memory access to the memory device 800.

Figure 2:
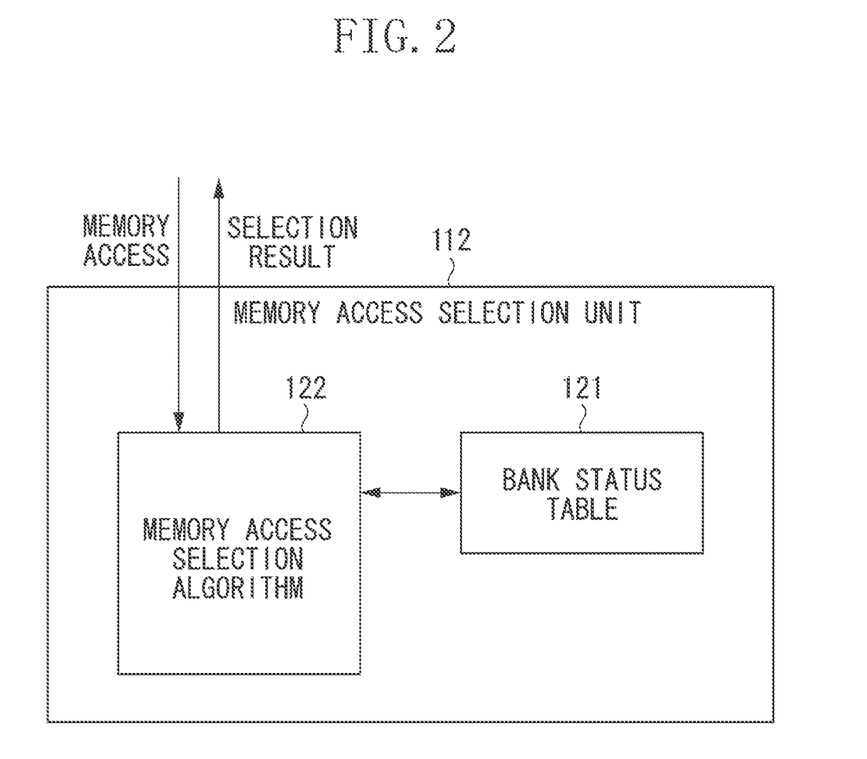
FIG. 2 illustrates a configuration of a memory access selection unit according to the first exemplary embodiment.

FIG. 2 illustrates a configuration of the memory access selection unit 112 according to the first exemplary embodiment. The memory access selection unit 112 includes a bank status table 121 and a memory access selection algorithm 122.

Figure 4:
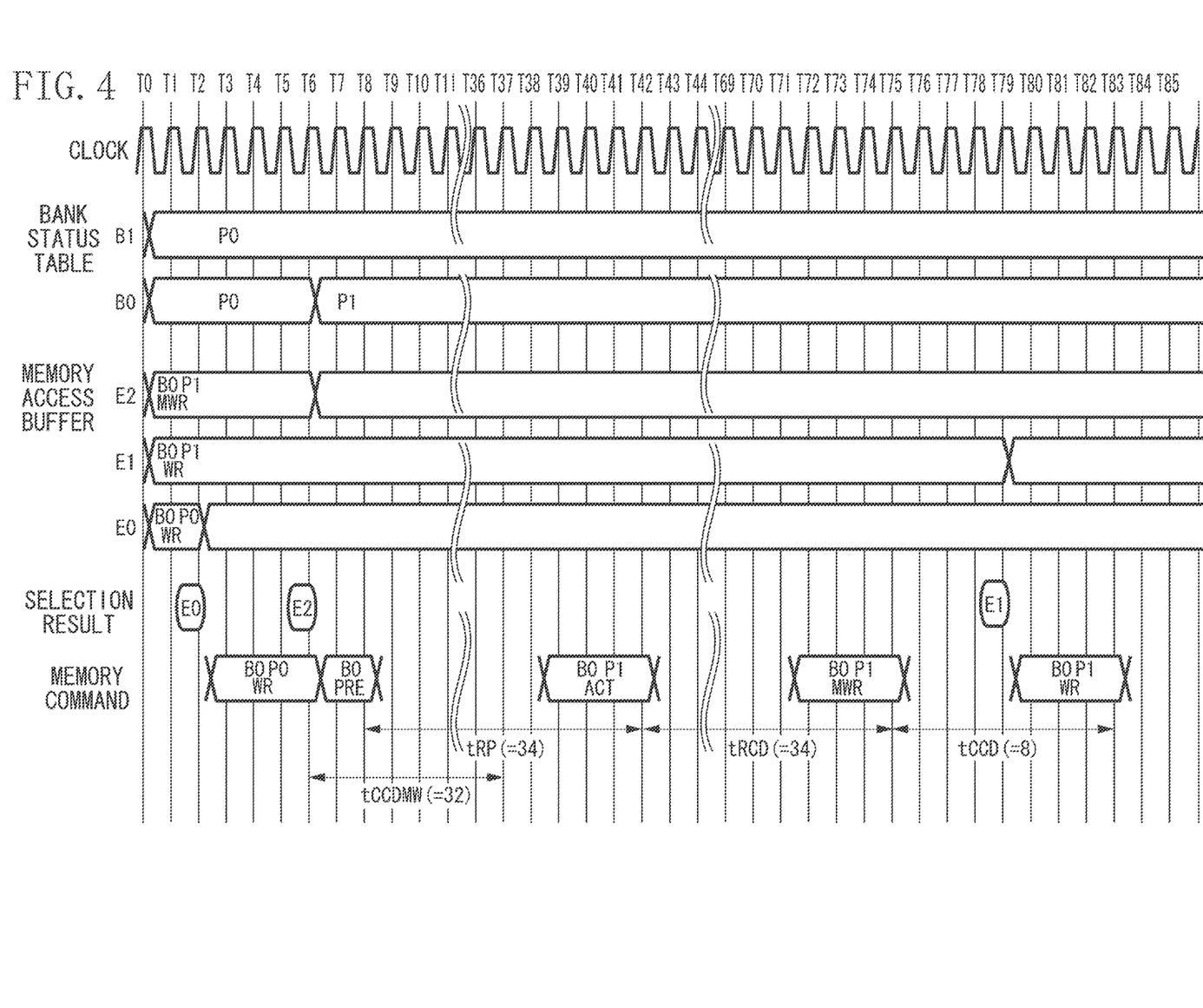
FIG. 4 is a waveform diagram illustrating a behavior of the memory controller according to the first exemplary embodiment.
Figure 9:
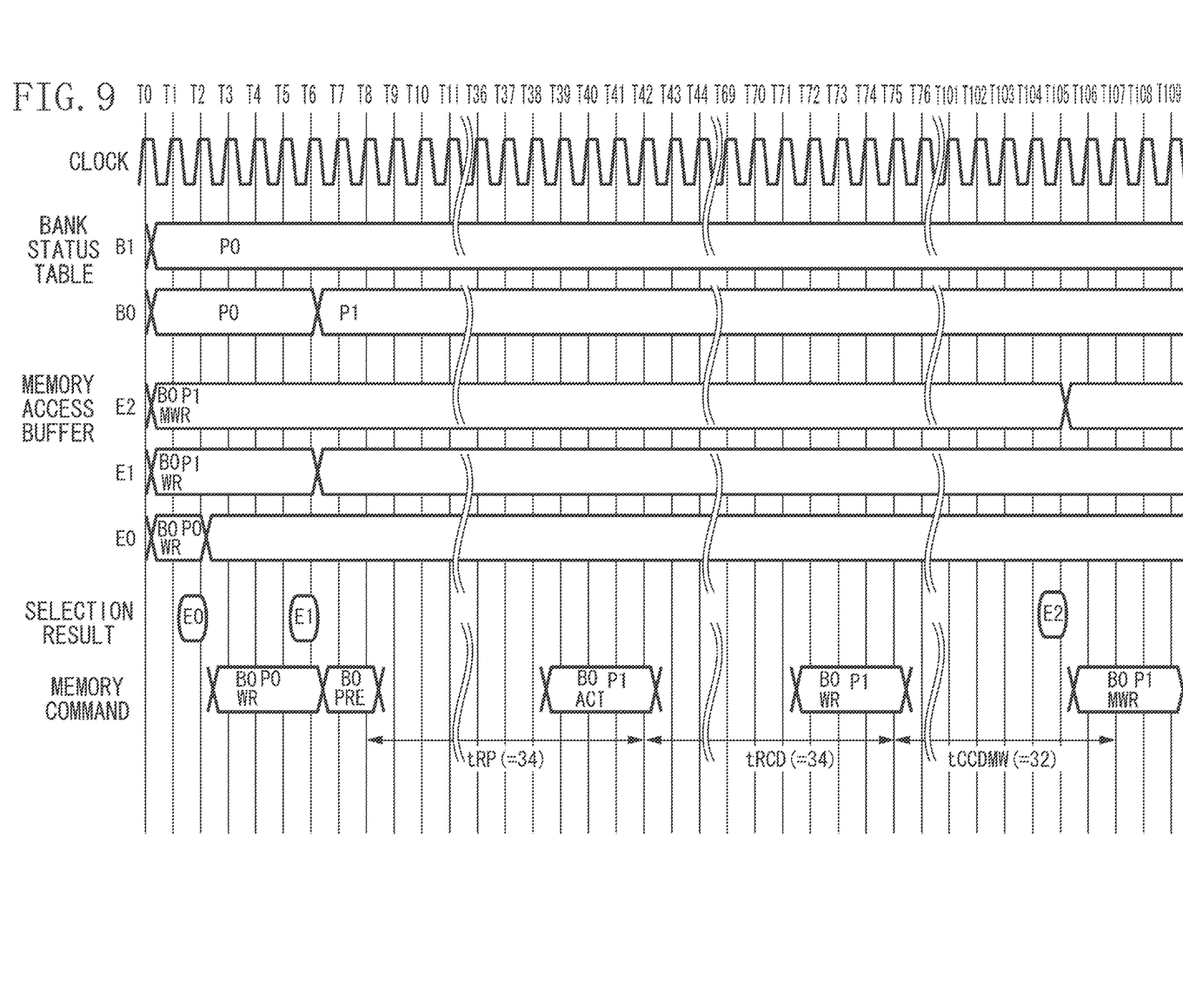
FIG. 9 is a waveform diagram illustrating a behavior of a conventional memory controller.

The bank status table 121 holds information indicating which bank page of the memory device 800 is activated. In the present exemplary embodiment, when the memory access selection unit 112 selects a memory access from the memory access buffer 111, the bank status table 121 is updated. The bank status tables in FIGS. 4 and 9 are also updated at this timing.

The memory access selection algorithm 122 selects a memory access to be transmitted next to the memory command generation unit 113 from the memory accesses held in the memory access buffer 111 and the information held in the bank status table 121.

Figure 3:
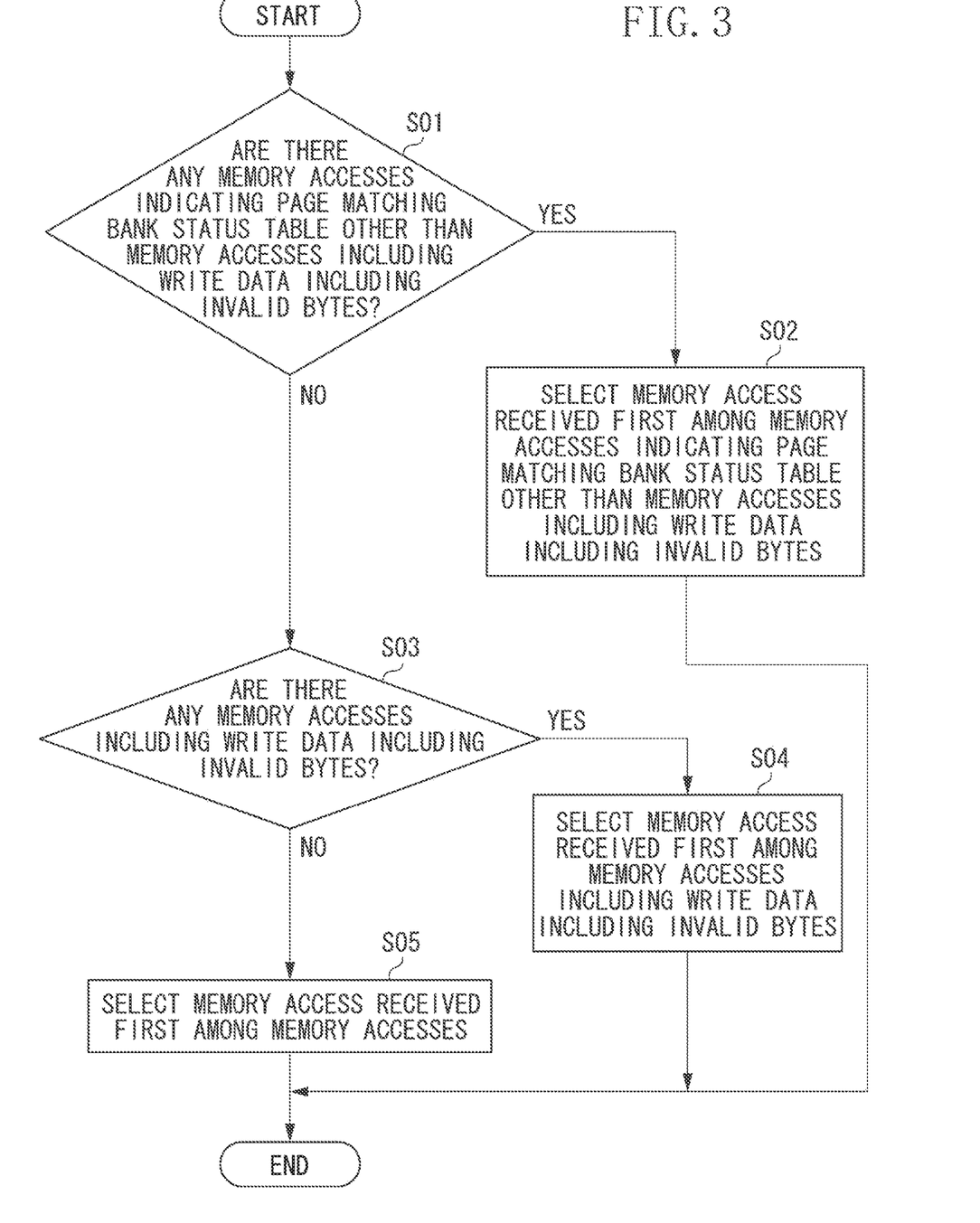
FIG. 3 is a flowchart of a memory access selection algorithm according to the first exemplary embodiment.

FIG. 3 is a flowchart of the memory access selection algorithm 122. In step S01, the memory access selection algorithm 122 determines whether the memory access buffer 111 holds memory accesses that do not result in a page-miss (namely, memory accesses that do not cause a page-miss) other than memory accesses including write data including invalid bytes. In a case where the memory access buffer 111 holds memory accesses that do not result in a page-miss (YES in step S01), the processing proceeds to step S02. In step S02, the memory access selection algorithm 122 selects a memory access that the memory access buffer 111 has received first among the memory accesses. By selecting the memory accesses that do not result in a page-miss, an overall system performance can be improved. In a case where the memory access buffer 111 does not hold any memory access that does not result in a page-miss (NO in step S01), the processing proceeds to step S03. In step S03, the memory access selection algorithm 122 determines whether the memory access buffer 111 holds memory accesses including write data including invalid bytes.

In a case where the memory access buffer 111 holds memory accesses including write data including invalid bytes (YES in step S03), the processing proceeds to step S04. In step S04, the memory access selection algorithm 122 selects a memory access that the memory access buffer 111 has received first among the memory accesses. In a case where all the memory accesses other than MWR commands result in a page-miss, the memory access selection algorithm 122 selects an MWR command. By selecting an MWR command, it is possible to make the penalty due to a page-miss overlap with the penalty due to an MWR command. As a result, the penalty on an overall system is reduced.

In a case where the memory access buffer 111 does not hold memory accesses including write data including invalid bytes (NO in step S03), the processing proceeds to step S05. In step S05, the memory access selection algorithm 122 selects a memory access that the memory access buffer 111 has received first.

An operation of the memory controller 100 according to the first exemplary embodiment will be described with reference to FIG. 4. The operation in FIG. 4 will be described, assuming that the memory device 800 includes two banks 0 and 1 and that the memory access buffer 111 holds three memory accesses "E0" to "E2". In addition, in FIG. 4, the banks 0 and 1 have statuses "B0" and "B1", and the banks 0 and 1 have active pages "P0" and "P1". The memory accesses "E0" to "E2" are held by the memory access buffer 111. The memory access "E0" indicates a WR command directed to the page 0 of the bank 0. The memory access "E1" indicates a WR command directed to the page 1 of the bank 0. The memory access "E2" indicates an MWR command directed to the page 1 of the bank 0. FIG. 4 also illustrates timing parameters "tRP", "tRCD", "tCCD", and "tCCDMW" defined in the memory device 800 (see JEDEC STANDARD No. 209-4A for details).

Since only the access memory "E0" in the memory access buffer 111 is not a page-miss at timing T2, the selection result is the memory access "E0" (step S02). As a result, the memory command generation unit 113 issues a WR command from timing T3 to timing T6.

Since both the memory accesses "E1" and "E2" in the memory access buffer 111 are a page-miss at timing T6, the selection result is the memory access "E2" (step S04). Since the memory access "E2" has been selected, the status "P0" of the bank 0 of the bank status table 121 is updated to "P1" at timing at T7. Since the memory access "E2" is a page-miss with respect to the bank 0, PRE and ACT commands are to be issued with respect to the bank 0. As a result, the memory command generation unit 113 issues a PRE command from timing T7 to timing T8. In addition, after time tRP, the memory command generation unit 113 issues an ACT command from timing T39 to timing T42. After time tRCD, the memory command generation unit 113 issues an MWR command from timing T72 to timing T75. At this point, time tCCDMW, which is a prescribed interval between a WR command and an MWR command, has already elapsed.

Since only the memory access "E1" is held in the memory access buffer 111 at timing T79 and does not result in a page-miss, the selection result is the memory access "E1" (step S02). As a result, the memory command generation unit 113 issues a WR command from timing T80 to timing T83.

FIG. 9 illustrates an operation performed when the memory accesses "E0", "E1", and "E2" held in the memory access buffer 111 are executed in this order. In this case, more time is needed than that needed in the example in FIG. 4 by the impact of the time penalty due to an MWR command.

As described above, in a state where the memory access buffer 111 holds a memory access request that causes a page-miss, the memory access selection algorithm 122 selects an MWR command including write data including an invalid byte. In this way, the time penalty due to write data including an invalid byte can be reduced by the time penalty due to a memory access that causes a page-miss.

Figure 5:
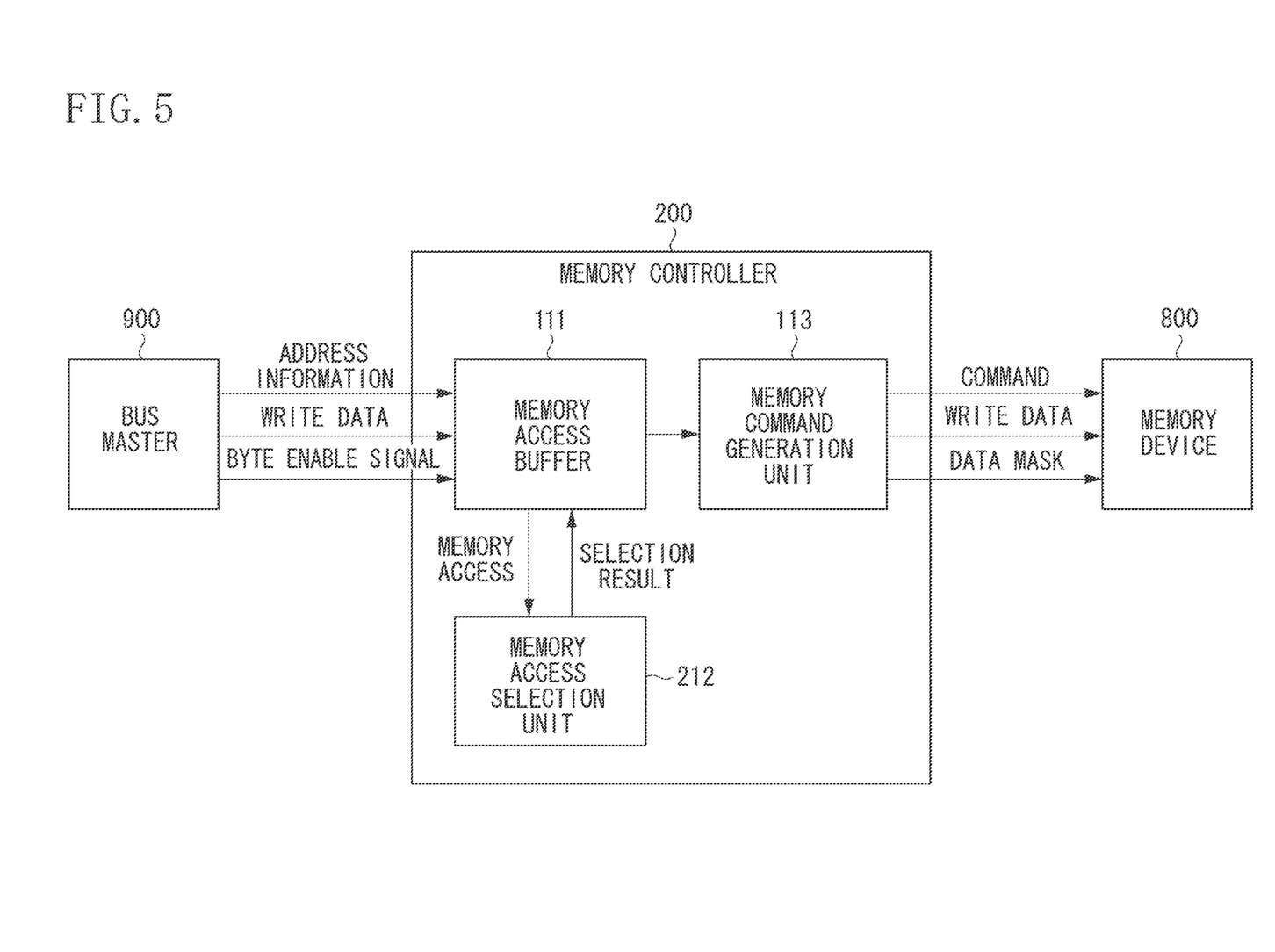
FIG. 5 illustrates a configuration of a memory controller according to a second exemplary embodiment.

FIG. 5 illustrates a configuration of a memory controller 200 according to a second exemplary embodiment. The memory controller 200 differs from the memory controller 100 according to the first exemplary embodiment only in a configuration of a memory access selection unit 212 included in the memory controller 200. Since other configurations are the same as those according to the first exemplary embodiment, redundant description thereof will be avoided.

Figure 6:
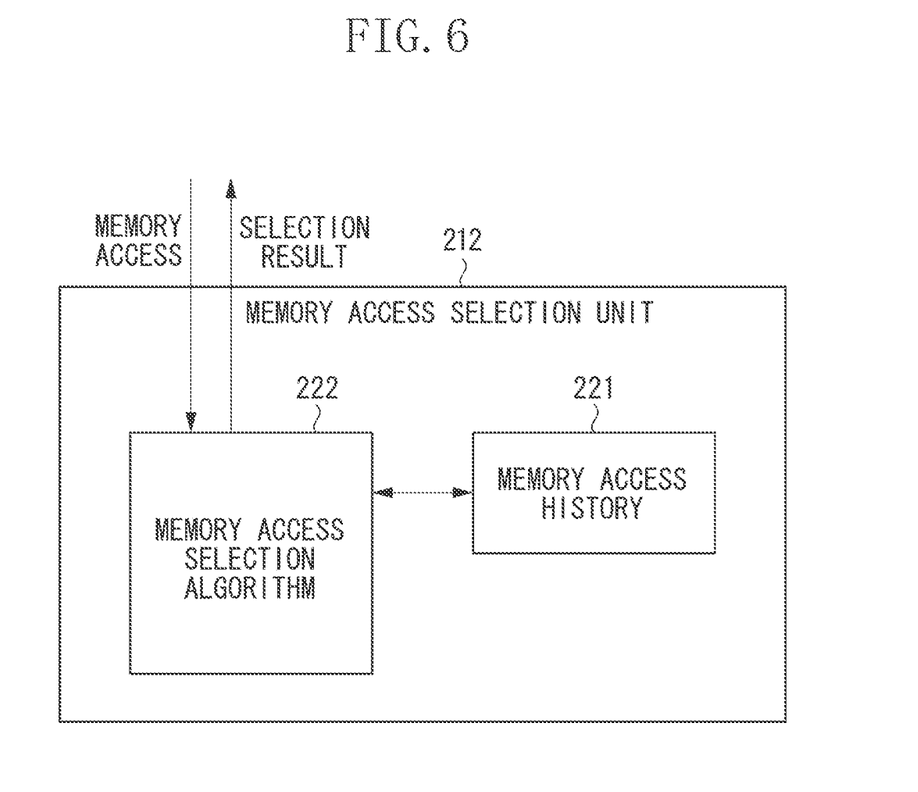
FIG. 6 illustrates a configuration of a memory access selection unit according to the second exemplary embodiment.

FIG. 6 illustrates the configuration of the memory access selection unit 212 according to the second exemplary embodiment. The memory access selection unit 212 includes a memory access history 221 and a memory access selection algorithm 222.

The memory access history 221 records information indicating whether the latest memory access executed last from the memory access buffer 111 is a write or read command. In the present exemplary embodiment, when selecting a memory access from the memory access buffer 111, the memory access selection algorithm 222 updates the memory access history 221.

The memory access selection algorithm 222 selects, from the memory accesses held in the memory access buffer 111 and information held in the memory access history 221, a memory access to be executed.

Figure 7:
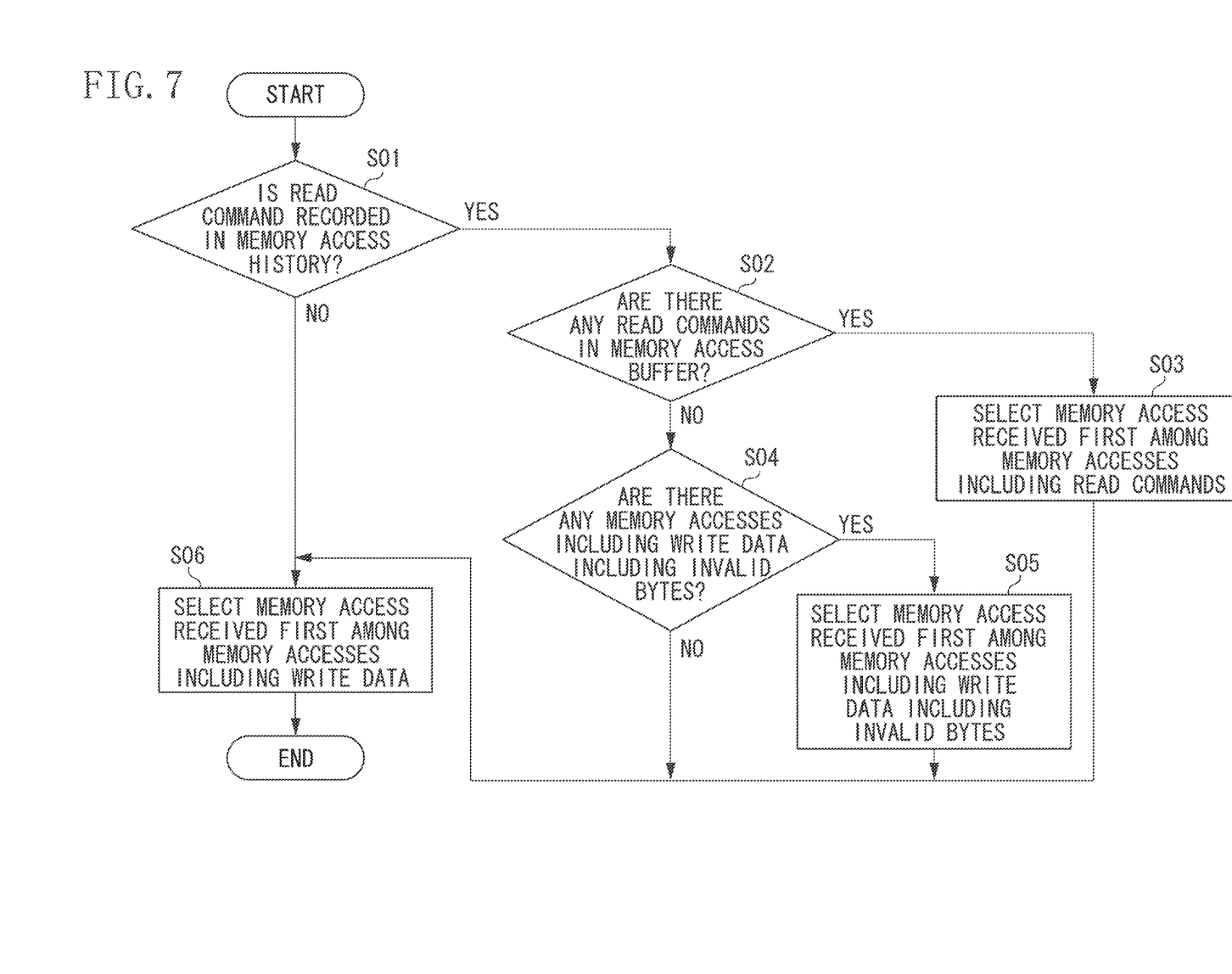
FIG. 7 is a flowchart of a memory access selection algorithm according to the second exemplary embodiment.

FIG. 7 is a flowchart of the memory access selection algorithm 222 according to the second exemplary embodiment. In step S01, the memory access selection algorithm 222 determines whether a read command is recorded in the memory access history 221. In a case where a read command is recorded in the memory access history 221 (YES in step S01), the processing proceeds to step S02. In step S02, the memory access selection algorithm 222 determines whether the memory access buffer 111 holds any read commands. In a case where the memory access buffer 111 holds read commands (YES in step S02), the processing proceeds to step S03. In step S03, the memory access selection algorithm 222 selects a memory access that the memory access buffer 111 has received first among the memory accesses including read commands. By executing a read command after a read command, the penalty due to switching from a read command to a write command can be reduced. In a case where the memory access buffer 111 does not hold any read commands (NO in step S02), the processing proceeds to step S04. In step S04, the memory access selection algorithm 222 determines whether the memory access buffer 111 holds write data including invalid bytes. In a case where the memory access buffer 111 holds write data including invalid bytes (YES in step S04), the processing proceeds to step S05. In step S05, the memory access selection algorithm 222 selects a memory access that the memory access buffer 111 has received first among the memory accesses. By selecting an MWR command, it is possible to make the penalty due to switching from a read operation to a write operation overlap with the penalty due to an MWR command. As a result, the penalty on an overall system is reduced. In a case where the memory access buffer 111 does not hold memory accesses including write data including invalid bytes (NO in step S04), the processing proceeds to step S06. In step S06, the memory access selection algorithm 222 selects a memory access that the memory access buffer 111 has received first among the memory accesses including write data.

Figure 8:
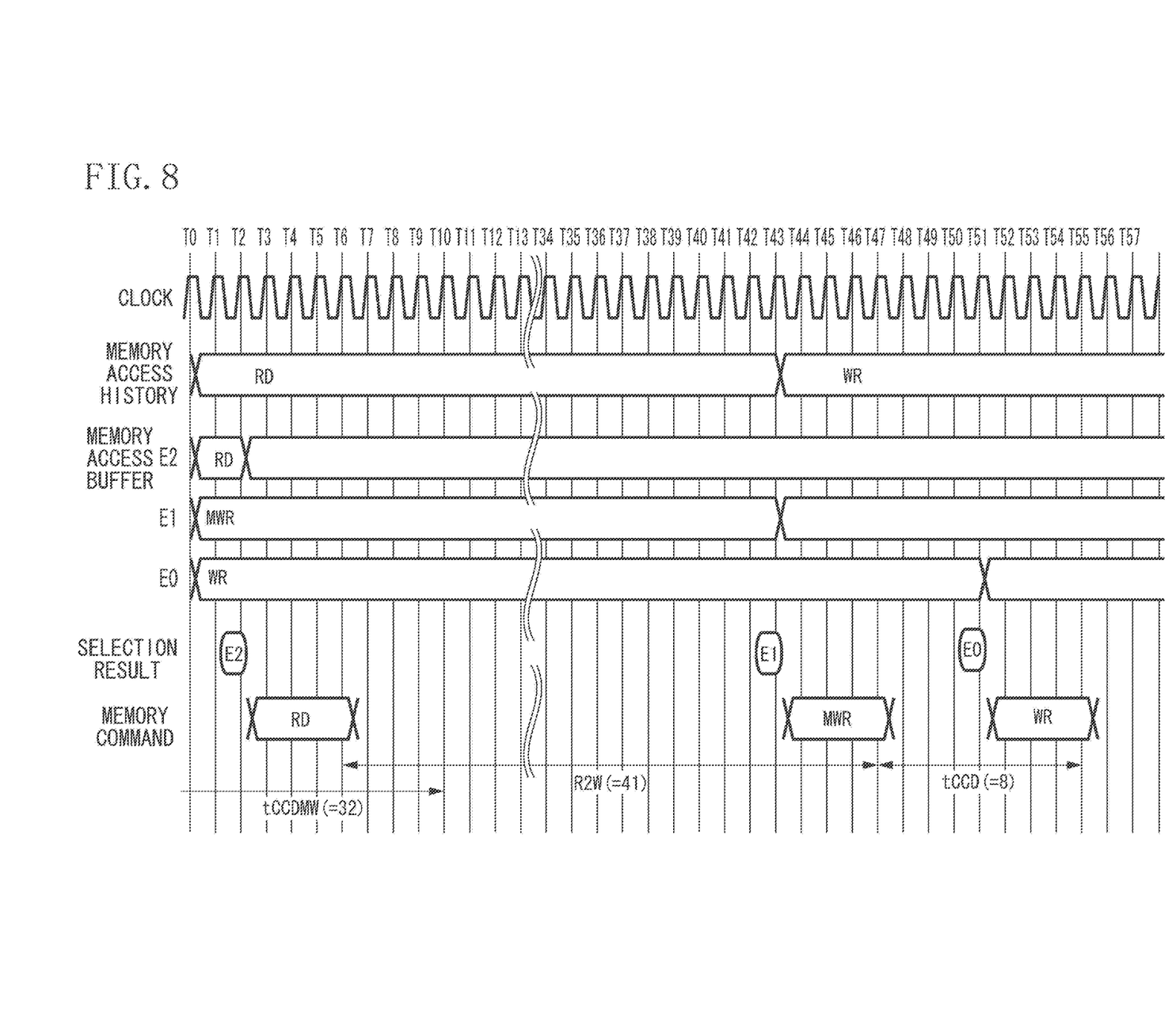
FIG. 8 is a waveform diagram illustrating a behavior of the memory controller according to the second exemplary embodiment.

Now, an operation of the memory controller 200 according to the second exemplary embodiment will be described with reference to FIG. 8. The operation in FIG. 8 will be described, assuming that the memory access buffer 111 holds three memory accesses. FIG. 8 illustrates a timing parameter "R2W" relating to switching from a read operation to a write operation. In addition, FIG. 8 also illustrates timing parameters "tCCD" and "tCCDMW" defined in the memory (see JEDEC STANDARD No. 209-4A for details).

Since the memory access history 221 holds a read command at timing T2 and only the memory access "E2" in the memory access buffer 111 is a read command, the selection result is the memory access "E2" (step S02). As a result, the memory command generation unit 113 issues an RD command from timing T3 to timing T6.

Since the memory access history 221 holds a read command at timing T43 and the memory access "E1" in the memory access buffer 111 is a write command including an invalid byte, the selection result is the memory access "E1" (step S04). As a result, the memory command generation unit 113 issues an MWR command from timing T44 to timing T47. At this point, the read command in the memory access history 221 is updated to a write command.

Since the memory access history 221 holds a write command at timing T51, the selection result is the memory access "E0" (S01). As a result, the memory command generation unit 113 issues a WR command from timing T52 to timing T55.

Figure 10:
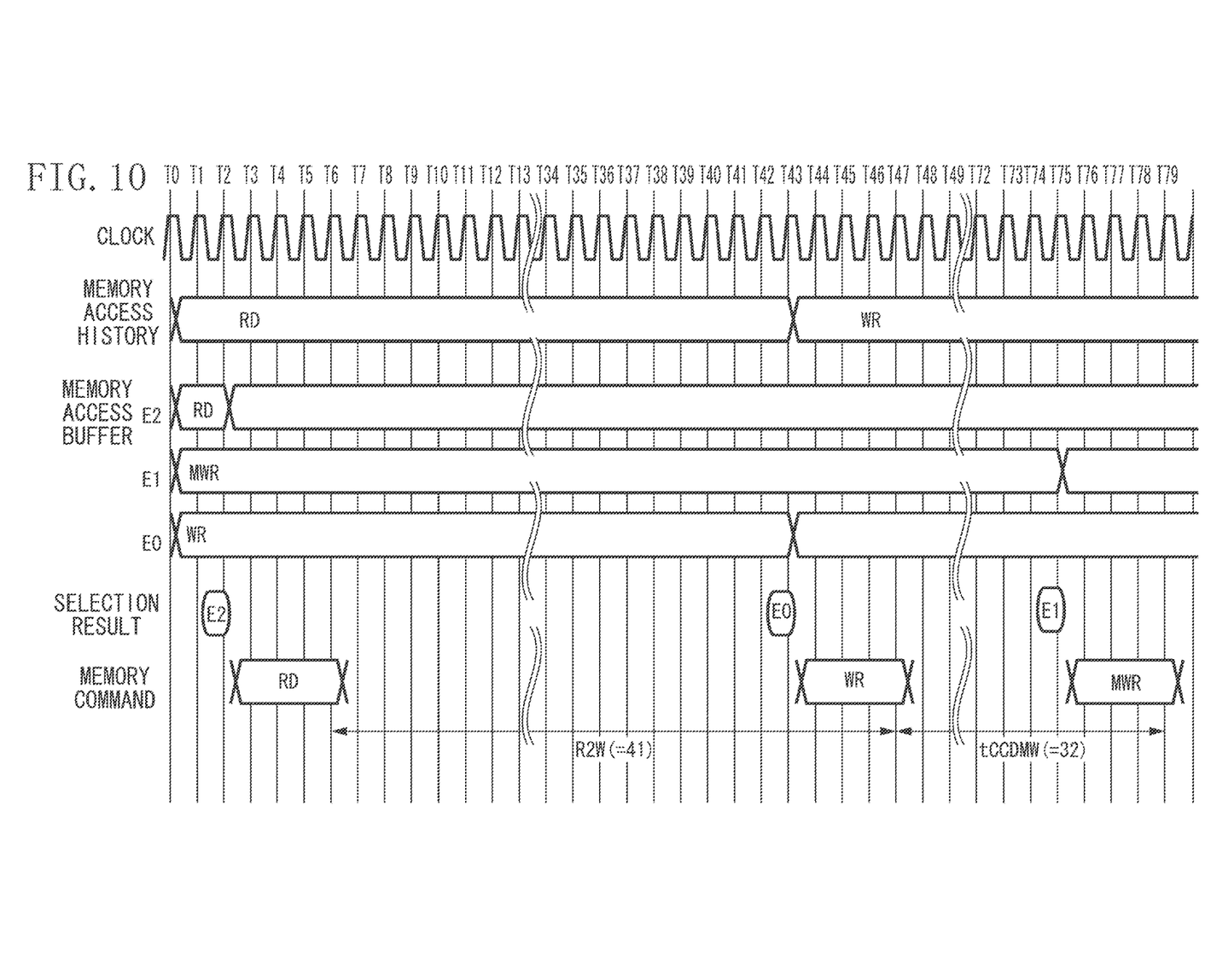
FIG. 10 is a waveform diagram illustrating a behavior of a conventional memory controller.

FIG. 10 illustrates an operation performed when the memory accesses "E2", "E0", and "E1" held in the memory access buffer 111 are executed in this order. In this case, more time is needed than that needed in the example in FIG. 8 by the impact of the time penalty due to an MWR command.

The above first and second exemplary embodiments have been described with the algorithms illustrated in FIGS. 3 and 7, different algorithms other than those illustrated in FIGS. 3 and 7 can be used. The aspect of the embodiments does not exclude modes in which an MWR command is issued when a penalty different from a penalty due to an MWR command is caused.

For example, a DRAM has a period in which a read or write operation cannot be performed due to a refreshing operation. A write command including an invalid byte can be executed after that period elapses.

According to an aspect of the embodiments, by issuing an MWR command when a penalty different from a penalty due to an MWR command is caused, the penalty due to the MWR command can be reduced.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-107452, filed May 31, 2017, which is hereby incorporated by reference herein in its entirety.

What is claimed is:

1. A controller which issues a first write command for writing all data of a burst access operation on a memory and a second write command for writing data of a burst access operation on a memory per byte, the controller comprising:
   a holding unit configured to hold a plurality of commands requesting access to the memory; and
   a selection unit configured to select, in a case where the holding unit holds the second write command and a command that causes a first time penalty longer than a second time penalty needed between the first write command that is issued first and the second write command that is issued next, the second write command prior to the command, the second write command is a Masked Write command defined in low power double-data-rate standard for dynamic random access memories (DRAMs).

2. The controller according to claim 1, wherein the first time penalty is a time penalty due to a page-miss.

3. The controller according to claim 1, wherein the first time penalty is a time penalty due to switching from a read operation to a write operation.

4. The controller according to claim 2, wherein, among the commands held in the holding unit, the selection unit selects a command that does not cause a page-miss prior to the second write command.

5. The controller according to claim 3, further comprising a history holding unit configured to hold a memory access history, wherein the selection unit selects a read command prior to the second write command among the commands, in a case where a latest history held in the history holding unit is a read command.

6. The controller according to claim 1, wherein the holding unit holds the plurality of commands in an order in which the controller has received access requests made to the memory from a master.

7. The controller according to claim 2,
   wherein the selection unit determines which page of the memory has been activated by referring to a bank status table, and
   wherein the selection unit selects the second write command first among the commands, in a case where the holding unit does not hold a command that does not cause a time penalty due to a page-miss.

8. The controller according to claim 1,
   wherein a time penalty due to a page-miss of a DRAM is longer than a time penalty caused when the Masked Write command is issued after a Write command, and
   wherein the selection unit selects a Masked Write command prior to a command that causes a time penalty due to a page-miss.

9. The controller according to claim 1, wherein the selection unit selects commands in an order in which the controller has received access requests made to the memory from a master, in a case where the holding unit does not hold any Masked Write command.

10. A method of a controller which issues a first write command for writing all data of a burst access operation on a memory and a second write command for writing data of a burst access operation on a memory per byte, the method comprising:
    holding a plurality of commands for requesting access to the memory in a holding unit; and
    selecting, in a case where the holding unit holds the second write command and a command that causes a first time penalty longer than a second time penalty needed between the first write command that is issued first and the second write command that is issued next, the second write command prior to the command, the second write command is a Masked Write command defined in low power double-data-rate standard for dynamic random access memories (DRAMs).

11. The method according to claim 10, wherein the first time penalty next is a time penalty due to a page-miss.

12. The method according to claim 10, wherein the first time penalty is a time penalty due to switching from a read operation to a write operation.

13. The method according to claim 11, wherein, in the selecting, among the commands, a command that does not cause a page-miss is selected prior to the second write command.

14. The method according to claim 12 further comprising holding a memory access history in a history holding unit, wherein, in the selecting, a read command is selected prior to the second write command among the commands, in a case where a latest history held in the history holding unit is a read command.

15. The method according to claim 10, wherein the plurality of commands are held in the holding unit in an order in which the controller has received access requests made to the memory from a master.

16. The method according to claim 11,
    wherein, in the selecting, which page of the memory has been activated is determined by referring to a bank status table, and
    wherein, the second write command is selected first among the commands, in a case where the holding unit does not hold a command that does not cause a time penalty due to a page-miss.

17. The method according to claim 1,
    wherein a time penalty due to a page-miss of a DRAM is longer than a time penalty caused when the Masked Write command is issued after a Write command, and
    wherein, in the selecting, a Masked Write command is selected prior to a command that causes a time penalty due to a page-miss.

18. The method according to claim 1, wherein, in the selecting, commands are selected in an order in which the controller has received access requests made to the memory from a master, in a case where the holding unit does not hold any Masked Write command.

* * * * *